(12) United States Patent
Cismas et al.

(10) Patent No.: US 10,484,507 B2
(45) Date of Patent: Nov. 19, 2019

(54) SYSTEM FOR HOLISTIC DATA TRANSMISSION THROUGHOUT AN ENTERPRISE

(71) Applicant: Bank of America Corporation, Charlotte, NC (US)

(72) Inventors: Sorin N. Cismas, Addison, TX (US); Manu Jacob Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 348 days.

(21) Appl. No.: 15/660,309

(22) Filed: Jul. 26, 2017

(65) Prior Publication Data

US 2018/0063288 A1 Mar. 1, 2018

Related U.S. Application Data

(63) Continuation of application No. 14/606,756, filed on Jan. 27, 2015, now abandoned.

(51) Int. Cl.
| | |
|---|---|
| *H04L 29/06* | (2006.01) |
| *G06F 21/62* | (2013.01) |
| *H04L 29/08* | (2006.01) |
| *G06F 3/0484* | (2013.01) |
| *H04L 12/14* | (2006.01) |
| *H04L 12/26* | (2006.01) |

(52) U.S. Cl.
CPC .......... *H04L 67/36* (2013.01); *G06F 3/04847* (2013.01); *H04L 12/1485* (2013.01); *H04L 43/06* (2013.01); *H04L 43/0888* (2013.01); *H04L 63/08* (2013.01); *G06F 21/62* (2013.01); *H04L 63/0428* (2013.01); *H04L 67/06* (2013.01)

(58) Field of Classification Search
CPC ..... H04L 63/04–0492; H04L 63/08–10; G06F 21/62–629
See application file for complete search history.

(56) References Cited

U.S. PATENT DOCUMENTS

| | | |
|---|---|---|
| 5,170,480 A | 12/1992 | Chandrasekaran et al. |
| 5,261,094 A | 11/1993 | Everson et al. |

(Continued)

*Primary Examiner* — Emmanuel L Moise
*Assistant Examiner* — Julian Chang
(74) *Attorney, Agent, or Firm* — Michael A. Springs; Moore & Van Allen PLLC; James C. Edwards

(57) ABSTRACT

An enterprise-wide centralized system for managing data transfer/movement provided by a technology-agnostic and protocol-agnostic data transfer/movement module. The system comprises a plurality of networked servers, one or more hub servers and a service delivery management framework. The system is structured for controlling the initiation and disablement of data transfers and configuring routing, timing and protocol(s) for data transfers. In addition, the system may be configured to provide (i) centralized control over user entitlements at a highly granular level, such as server-level, route-level or the like, (ii) the ability to track data transmission progress, such as by providing a real-time view of the status of enterprise-wide data transmission (iii) centralized management over data transmission records and set logs and facilitate full tracking data including transmission errors and (iv) centralized control over security and governance of data transmissions, including approval/denial of data transmissions.

20 Claims, 4 Drawing Sheets

(56) References Cited

U.S. PATENT DOCUMENTS

| | | |
|---|---|---|
| 5,287,496 A | 2/1994 | Chen et al. |
| 5,412,384 A | 5/1995 | Chang et al. |
| 5,440,735 A | 8/1995 | Goldring |
| 5,553,279 A | 9/1996 | Goldring |
| 5,577,240 A | 11/1996 | Demers et al. |
| 5,627,961 A | 5/1997 | Sharman |
| 5,640,561 A | 6/1997 | Satoh et al. |
| 5,787,247 A | 7/1998 | Norin et al. |
| 5,913,900 A | 6/1999 | Stone |
| 6,035,307 A | 3/2000 | Martin et al. |
| 6,055,519 A | 4/2000 | Kennedy et al. |
| 6,157,915 A | 12/2000 | Bhaskaran et al. |
| 6,185,613 B1 | 2/2001 | Lawson et al. |
| 6,211,782 B1 | 4/2001 | Sandelman et al. |
| 6,405,212 B1 | 6/2002 | Samu et al. |
| 6,446,089 B1 | 9/2002 | Brodersen et al. |
| 6,560,776 B1 | 5/2003 | Breggin et al. |
| 6,697,809 B2 | 2/2004 | Chen et al. |
| 6,880,016 B1 * | 4/2005 | Van Der Heijden ........... G06Q 10/107 709/230 |
| 7,899,915 B2 * | 3/2011 | Reisman ............... G06F 16/954 709/228 |
| 8,018,943 B1 * | 9/2011 | Pleshek ................ H04L 43/028 370/254 |
| 8,098,677 B1 * | 1/2012 | Pleshek .................... H04L 43/12 370/351 |
| 8,146,100 B2 * | 3/2012 | Kilian-Kehr ............ G06F 9/542 709/204 |
| 8,645,841 B2 * | 2/2014 | Ghosh ................. G06Q 10/109 709/206 |
| 8,929,859 B2 * | 1/2015 | McNamee .......... H04L 12/1407 455/406 |
| 8,934,495 B1 * | 1/2015 | Hilton .................... H04L 67/36 370/401 |
| 9,262,152 B1 * | 2/2016 | Kurian ...................... G06F 8/65 |
| 9,307,027 B2 * | 4/2016 | Shimizu ............. H04L 67/2823 |
| 9,515,957 B2 * | 12/2016 | Kurian ............... H04L 47/783 |
| 9,544,340 B2 * | 1/2017 | Ezell ................. H04L 65/1016 |
| 9,594,580 B2 * | 3/2017 | Runkis ............... G06F 9/45533 |
| 9,716,692 B2 * | 7/2017 | Cismas .................. H04L 63/04 |
| 9,977,479 B2 * | 5/2018 | Schoening ............ G06F 1/3209 |
| 10,270,840 B2 * | 4/2019 | Cismas ................... H04L 67/10 |
| 10,375,213 B2 * | 8/2019 | Reynolds |
| 2005/0105530 A1 * | 5/2005 | Kono ..................... H04L 29/06 370/395.5 |
| 2005/0240550 A1 | 10/2005 | Armes et al. |
| 2008/0082960 A1 * | 4/2008 | McDougal ............ G06Q 10/06 717/107 |
| 2012/0226808 A1 | 9/2012 | Morgan |
| 2016/0218935 A1 * | 7/2016 | Cismas ............... G06F 3/04847 |
| 2019/0109793 A1 * | 4/2019 | Dalal .................. H04L 47/2441 |

* cited by examiner

SYSTEM FOR HOLISTIC DATA TRANSMISSION THROUGHOUT AN ENTERPRISE

FIELD

In general, embodiments of the invention relate to network data communication and, more particularly, a system for managing holistic data transmission implemented across a plurality of servers/network devices within an enterprise.

BACKGROUND

In large network systems, it is imperative that the transfer of essential data occur in a highly secure environment. For example, users routinely communicate activity files and image files across a network on an ongoing basis and it is necessary to ensure that such data is transferred in a highly reliable and secure manner.

Currently, such transfer of activity files, image files or the like requires the user to execute a transfer activity using any of the various commercial file transfer applications in existence. These file transfer applications tend to be technology and/or protocol-specific or limited in terms of the technology and or protocols that may be implemented in order to ensure that the transfer of data occurs securely. In a large enterprise, which may provide numerous different services to a user, each service may dictate a different means for transferring data based on the frequency and volume of data transferred, the security/risk associated with transferring the data and the like.

Further, in a large enterprise environment, the third party systems (otherwise referred to herein as external entities) that transfer data to the enterprise will vary in terms of size and information technology sophistication. For example, large external entities (e.g., large customer entities) will generally have extensive information technology support, which is capable of setting-up, maintaining and properly executing all of the different file transfer applications required of the third-party. However, on the opposite end of the spectrum, micro- or small-external entities (e.g., individuals, micro- or small-customer entities), will generally have very limited, if any, information technology support and, as such, face many obstacles in being able to set-up, properly execute and maintain different file transfer applications.

Moreover, all of the disparate systems that an enterprise implements to conduct data transmission require individual management. Specifically, each system requires separate tools, dashboards and the like to allow the user to view operational status, analyze transaction/transmission records/logs, and perform other related management functions.

Therefore, a need exists to develop systems, apparatus, computer program products, methods and the like that provide for technology-agnostic and protocol-agnostic means for transferring data between an enterprise, such as a financial institution or the like and external entities, such as external entity systems, customers and the like. The desired systems, apparatus, computer program products, methods and the like should provide the user with an off-the-shelf solution that is applicable to all of the different services provided by the enterprise and provides the user/external entity with a streamlined means for transferring data to and from the enterprise. In this regard, the systems, apparatus, computer program products, methods and the like should allow for the external entity to immediately transfer data upon inception of the relationship with the enterprise and/or upon acquisition of a new service provided by the enterprise. Moreover, the systems, apparatus, computer program products, methods and the like should minimize external entity involvement from an Information Technology (IT) standpoint, such that any user can efficiently, effectively and reliably transfer data to and from an enterprise with minimal risk and high confidence. In addition, the desired systems, apparatus, computer program products, methods and the like should provide for unified and centralized management over the data transmission and transaction process.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a technology-agnostic and protocol-agnostic system for delivering services including data movement/transfer within an enterprise. The embodiments herein described provide for a modular system that is easy and cost-effective to deploy and is extensible, such that as new services are warranted, additional modules can readily be added to the system. The technology/OS-agnostic nature of the system means that any server, regardless of manufacturer or OS, can be assimilated into the system for the purpose of sending and/or receiving data. Moreover, the protocol-agnostic aspect of the system means that data can be transferred/communicated using any known, or future known, protocol (without requiring a separate application specific to the desired protocol).

In addition, the system herein described provides for a comprehensive and unified approach to data movement/transfer within an enterprise. As such, the integrated system, in addition to providing for data movement transmissions/transactions, also provides for unified governance control over the movement of data, unified tracking of data movement across the enterprise, unified auditing processes, granularity of control at the file level and the like.

Moreover, the system herein described provides for a unified and centralized dashboard/user-interface for managing, enterprise-wide, data transmission/transactions. In this regard, the data transmission dashboard is configured to allow users to initiate and disable data transmissions, as well as configure routing, timing and protocols for data transmissions/transactions. Moreover, the dashboard/user-interface is configured to allow users to view operational status of presently ongoing data transmissions, including current routing location of the data and the like. In addition, the dashboard/user-interface is configured to allow users analyze, review transaction records and historical transaction logs for the purpose of conducting audits, performing corrective actions and the like. Other embodiments of the dashboard/user-interface are configured to provide centralized billing for data transmissions across the enterprise, centralized security and governance over data transmissions and/or centralized management over alert functionality.

An apparatus for management of data transmissions within an enterprise defines first embodiments of the invention. The apparatus includes a computing platform having a memory and at least one processor in communication with the memory. The apparatus further includes a modular-based, service delivery application stored in the memory, executable by the processor and including a data transfer module configured to provide data connections between a plurality of servers in the enterprise. In addition, the apparatus includes a service delivery management framework that is stored in the memory and executable by the processor. The service delivery management framework includes a data transmission dashboard application configured to provide a plurality of user-interfaces. At least one of the user-interfaces is configured to allow a user to (1) initiate and disable data transmissions performed by the data transfer module, and (2) configure routing, timing and protocol for the data transmissions.

In specific embodiments of the apparatus, the data transmission dashboard application further includes at least one user-interface configured to allow a user to manage data transmission-user entitlements (otherwise referred to as permissions, access rights or the like) at a server-level and a route-level. In this regard, entitlement of the user at the server is not required, since the user can be entitled via the data transfer module and, such entitlements can be granular (i.e., at the server-level, the route-level or the like).

In further specific embodiments of the apparatus, the data transmission dashboard application further includes at least one user-interface configured to allow a user to track, in real-time, a status of ongoing data transmissions performed by the data transfer module. In such embodiments of the apparatus, tracking includes previous routing location(s) of the data, current location(s) of the data, and future routing location(s) of the data.

In still further specific embodiments of the apparatus, the data transmission dashboard application further includes at least one user-interface configured to allow a user to analyze records of completed data transmissions performed by the data transfer module at a data type-level and a server-level for a purpose of enterprise-wide data transmission auditing. In this regard, the data transmission dashboard application may further include at least one user-interface configured to provide a user access to archival uniform set logs of data transmission records that include full tracking and data transmission errors.

Moreover, in still further embodiments of the apparatus, the data transmission dashboard application further includes at least one user-interface configured to allow a user to manage an enterprise-wide data transmission billing process for data transmissions performed by the data transfer module. In additional embodiments, the data transmission dashboard application is further includes at least one user-interface configured to allow a user to manage enterprise-wide security and governance of data transmissions performed by the data transfer module, including specific rules based on data types and/connection points/servers.

Additionally, in further specific embodiments of the apparatus, the data transmission dashboard application is further includes at least one user-interface configured to allow a user to manage an enterprise-wide alert system associated with data transmissions performed by the data transfer module.

A system for managing enterprise-wide data transmissions comprises second embodiments of the invention. The system includes a plurality of networked servers. Each of the servers includes a first computing-platform having a first memory and at least one first processor in communication with the first memory. The system further includes a modular-based, service delivery application that is stored in each first memory, and executable by the corresponding first processor. The service delivery application includes a data transfer module configured to provide data connections between the plurality of servers in the enterprise. Additionally, the system includes one or more hub servers. Each hub server, which is in communication with networked servers, includes a second computing-platform having a second memory and at least one second processor in communication with the second memory. Further, the system includes a service delivery management framework that is stored in the memory and executable by the processor. The framework includes a data transmission dashboard application configured to provide a plurality of user-interfaces. At least one of the user-interfaces is configured to allow a user to (1) initiate and disable data transmissions performed by the data transfer module, and (2) configure routing, timing and protocol for the data transmissions.

A computer-program product including a non-transitory computer-readable medium defines third embodiments of the invention. The computer-readable medium includes a first set of codes for causing a computer to provide one or more first user-interfaces configured to allow a user to initiate and disable data transmissions performed by an enterprise-wide protocol-agnostic and operating system-agnostic data transfer module. The computer-readable medium further includes a second set of codes for causing a computer to provide one or more second user-interfaces configured to allow a user to configure routing, timing and protocol for the data transmissions.

Thus, systems, apparatus, methods, and computer program products herein described in detail below provide for a technology-agnostic and protocol-agnostic means for providing services within an enterprise including data transfer/movement. Additionally, embodiments herein described provide for an enterprise-wide centralized dashboard/user-interface for managing data transfer/movement including controlling the initiation and disablement of data transfers and configuring routing, timing and protocol(s) for data transfers. In addition, the dashboard/user-interface is configured to provide centralized control over user entitlements at a highly granular level, such as server-level, route-level or the like. Moreover, the dashboard/user-interface may be configured to track data transmission progress, such as by providing users a real-time view of the status/location of a data transmission. In addition, the dashboard/user-interface may be configured to provide centralized management over data transmission records and set logs, such that a user can analyze data transmissions across the enterprise and view full tracking data including transmission errors.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
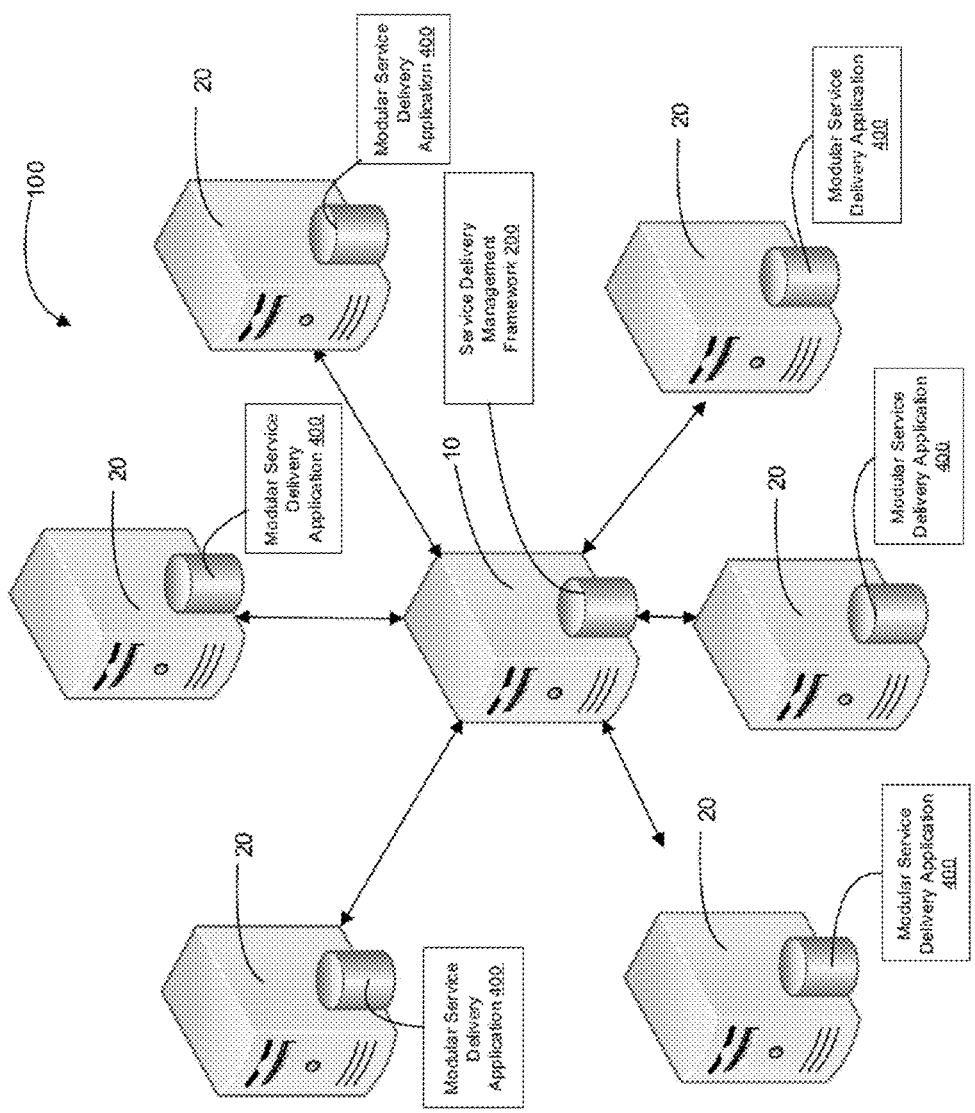
Figure 2:
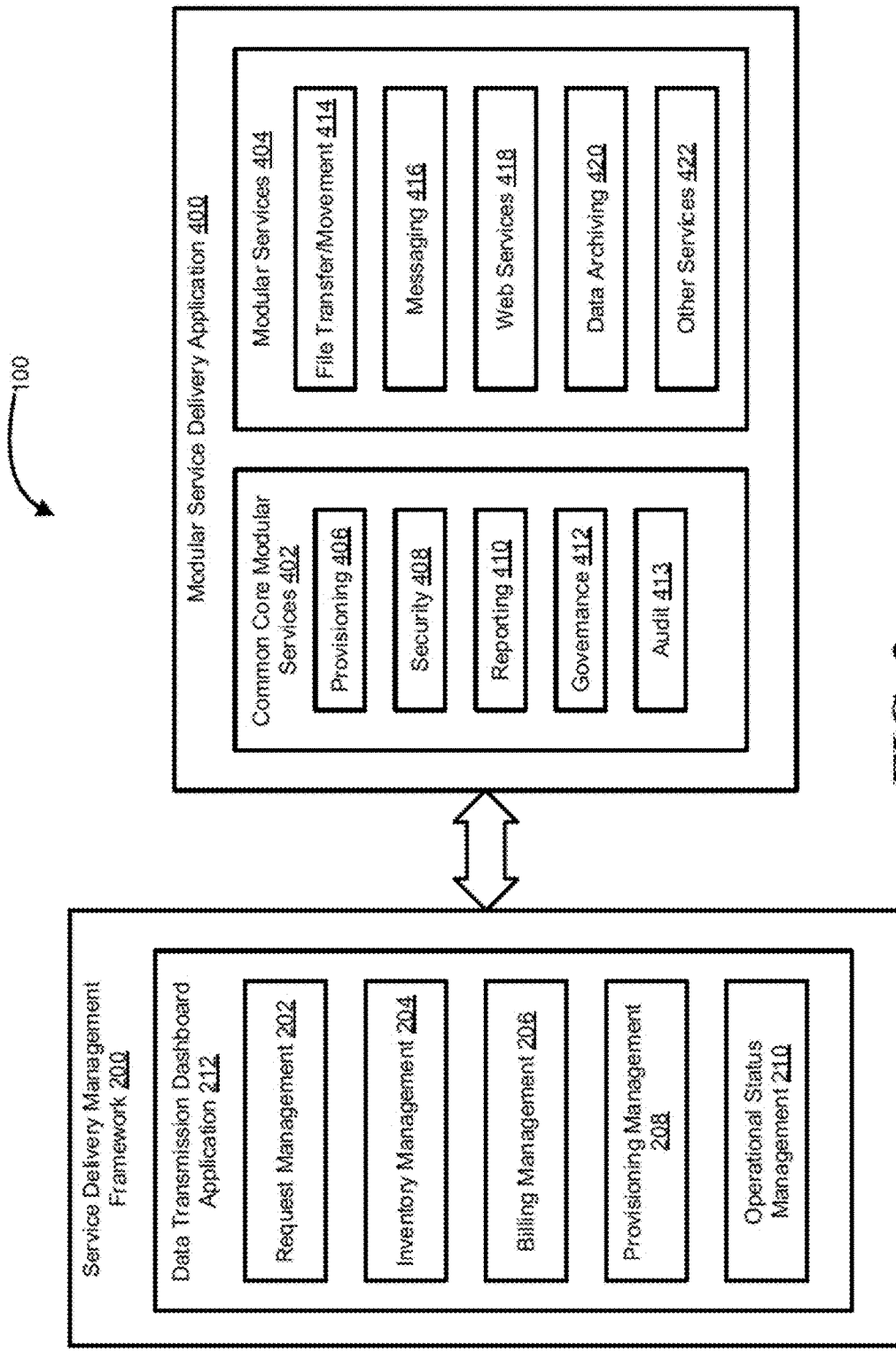
Figure 3:
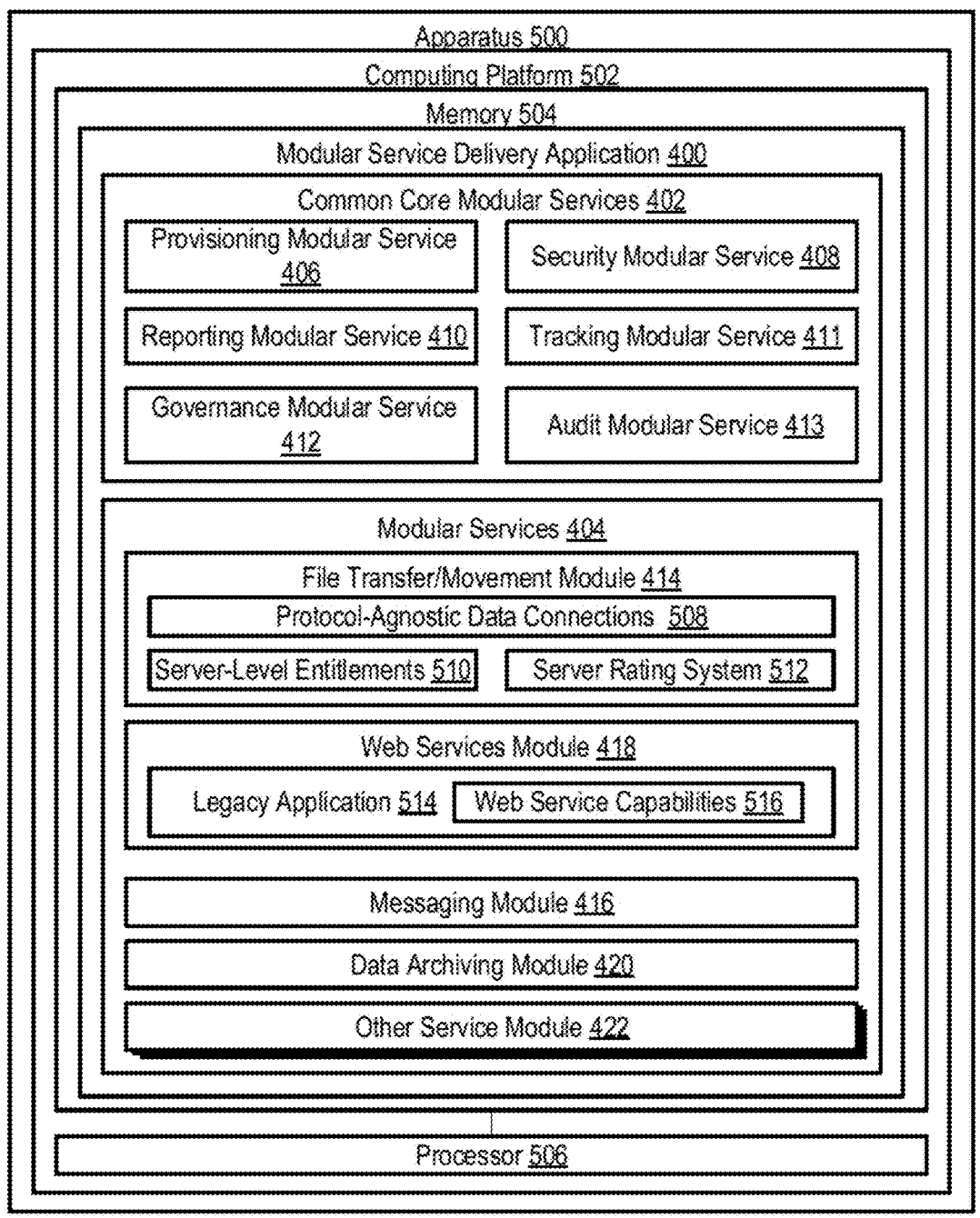
Figure 4:
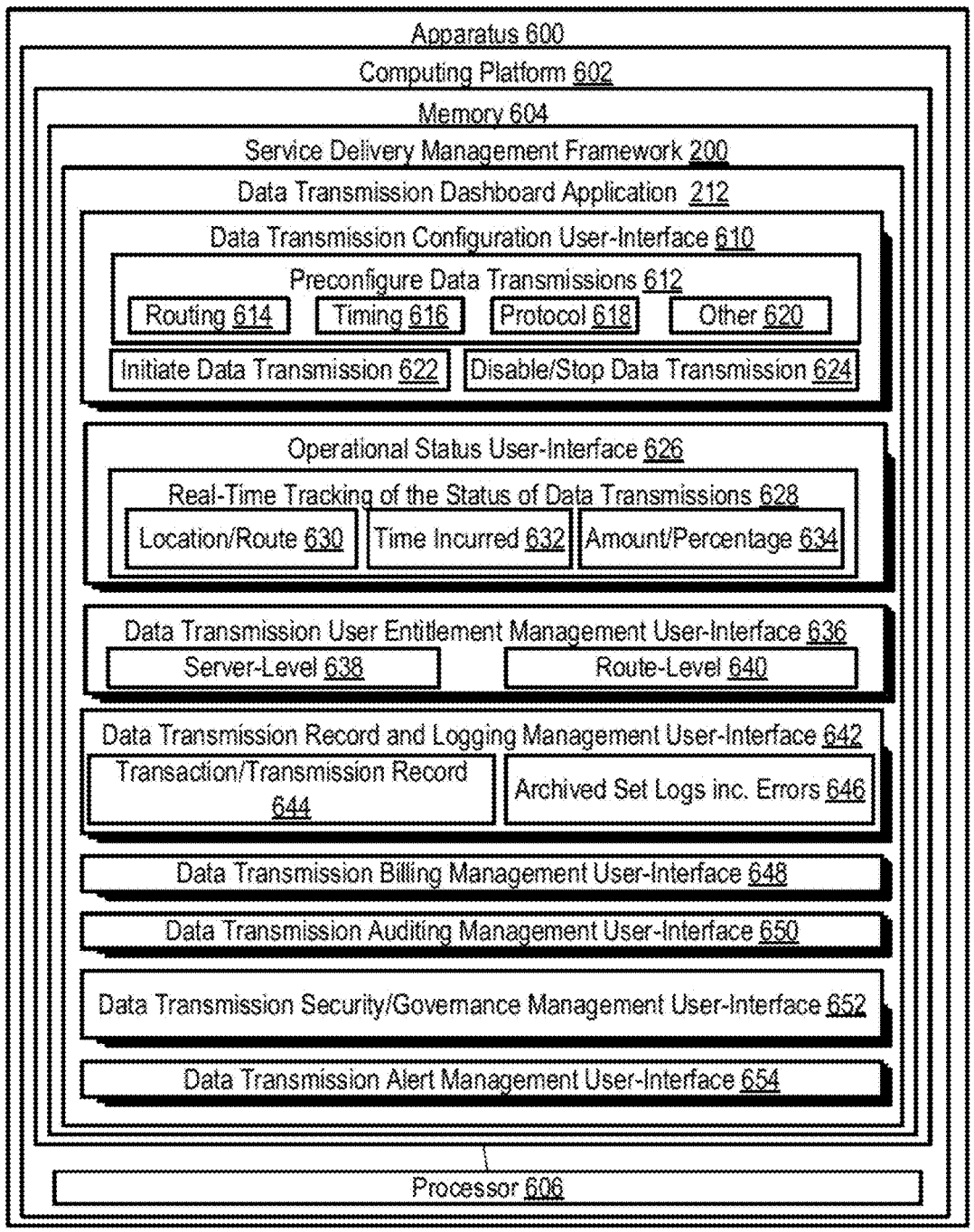

Having thus described embodiments of the invention in general terms, reference will now be made to the accompanying drawings, which are not necessarily drawn to scale, and wherein:

FIG. 1 provides a schematic diagram of a system for enterprise-wide service delivery including data movement/transfer and related data transfer management, in accordance with embodiments of the present invention;

FIG. 2 provides a block diagram of a system for enterprise-wide service delivery including data movement/transfer and related data transfer management, in accordance with embodiments of the present invention;

FIG. 3 provides a block diagram of the apparatus configured for an extensible module system including technology/OS-agnostic and protocol-agnostic data movement, in accordance with embodiments of the present invention; and FIG. 4 provides a block diagram of an apparatus configured for providing service delivery management framework including a data transmission dashboard application, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a technology-agnostic and protocol-agnostic system for delivering services, including data movement/transfer within an enterprise. The embodiments herein described provide for a modular system that is easy and cost-effective to deploy and is extensible, such that as new services are warranted, additional modules can readily be added to the system. The technology/OS-agnostic nature of the system means that any server, regardless of manufacturer or OS, can be assimilated into the system for the purpose of providing the services including sending and/or receiving data. Moreover, the protocol-agnostic aspect of the system means that data can be transferred/communicated using any known, or future known, protocol (without requiring a separate application specific to the desired protocol). As such the present invention eliminates the need to utilize, maintain and configure compatibility amongst numerous OS-specific and/or protocol-specific applications for delivering such services, such as numerous data transfer applications and the like.

In addition, the system herein described provides for a comprehensive and unified approach to managing the services provided by the modular service delivery system. As such, the integrated system, in addition to providing the services, such as data movement transmissions/transactions, messaging, web services and the like also provides for unified governance control over the services, unified tracking of the services across the enterprise, unified auditing processes, granularity of control and the like. Such unified management control over the services eliminates the need to implement disparate security rules/processes, governance procedures, auditing practices and the like.

Moreover, the system herein described provides for a unified and centralized dashboard/user-interface for managing, enterprise-wide, data transmission/transactions. In this regard, the data transmission dashboard is configured to allow users to initiate and disable data transmissions, as well as configure routing, timing and protocols for data transmissions/transactions. Moreover, the dashboard/user-interface is configured to allow users to view operational status of presently ongoing data transmissions, including current routing location of the data and the like. In addition, the dashboard/user-interface is configured to allow users analyze, review transaction records and historical transaction logs for the purpose of conducting audits, performing corrective actions and the like. Other embodiments of the dashboard/user-interface are configured to provide centralized billing for data transmissions across the enterprise, centralized security and governance over data transmissions and/or centralized management over alert functionality.

Referring to FIG. 1, a schematic diagram is provided of a system 100 for providing technology/OS-agnostic and protocol-agnostic delivery of services within an enterprise. The system 100 is configured as a hub-and-spoke model, in which the hub server 10 provides for management of the service delivery system via service delivery management framework 200 and the spoke networked servers 20, implemented throughout the enterprise, are deployed with a modular service delivery application 400. The service delivery application 400 is an open source based web services application and, as such, can be deployed and/or executed on any type of server (technology-agnostic) executing any type of operating system (OS-agnostic). The modular nature of the application means that the service delivery system is extensible; as additional services are added new modules within the application 400 may be added/plugged-in into the application 400. As such, the present invention provides a holistic approach to service delivery that results in an enterprise-wide solution for service delivery. While FIG. 1 illustrates a single hub server 10 in practice the system may comprise a plurality of hub servers 10, each having multiple networked-servers 20 in communication therewith.

In specific embodiments of the invention, the service delivery application 400 includes a data movement/file transfer module (shown and described in FIGS. 2 and 3) that is configured to provide protocol-agnostic file transfer/transactions capabilities throughout the enterprise. Since the file transfer/data movement is configured as an open source application that is protocol-agnostic, deployment and use of data movement/file transfer module throughout most, if not all, of the enterprise's servers eliminates the need to deploy, maintain and configure compatibility amongst multiple different protocol-specific file transfer applications. In specific embodiments of the invention, the data movement/file transfer module relies on File Transfer Protocol Software (FTPS) that adds support for Transport Layer Security (TLS) and Secure Sockets Layer (SSL) encryption protocols.

Service delivery application 400 provides uniform management for all of the services delivered by service delivery application 400. In this regard, service delivery application 400 includes core services that act as a unifier to provide umbrella-like management over security, governance (approvals and exceptions), provisioning (new modules and revisions to modules), auditing, tracking, reporting and the like. Such uniformity in management provides efficiency and eliminates the need to resolve conflicts that arise in disparate applications having distinct security, governance, provisioning protocols, rules and regulations. For example, from a security perspective when individual protocol-specific data transfer applications are executed by an enterprise, each application will typically require a separate SSL (Secure Socket Layer) certificate to exist on each server; however, the present invention is configured such that only a single SSL certificate per server and the single SSL certificate can be used to authenticate all of the services delivered by the application 400. It should be noted that while the system only requires a single SSL certificate per server, the application 400 is configured to accommodate multiple SSL certificates if the application or a module within the application warrants such.

In accordance with embodiments of the present invention, service delivery management framework 200 includes a data transmission dashboard application that includes various user-interfaces configured to allow a user to centrally and uniformly manage enterprise-wide data transmission. In accordance with embodiments herein described, the data transmission dashboard application includes user-interfaces configured to allow users to pre-configure, initiate and disable data transmissions, including, configure routing, timing and protocols for data transmissions.

Referring to FIG. 2, a block diagram is presented of a system 100 configured for providing technology/OS-agnostic and protocol-agnostic delivery of services within an enterprise, in accordance with an embodiment of the present invention. The system 100 includes modular service delivery application 400 that includes common core services 402 and modular services 404. The core services 402 are common to all of the modular services 404 in the application and provide for unified umbrella-like management of the modular services. The core services may include, but are not necessarily limited to, provisioning 406, security 408, reporting 408 and governance/auditing 410.

The provisioning service 406 is configured to provide for uniform deployment of new modular services 404 and deployment of revisions/updates to existing modular services 404. In addition, provisioning service 406 is configured to provide hierarchical ordering of deployment based on criticality (i.e., server level), compliance and the like. Moreover, provisioning service 406 is configured to schedule deployment updates/revision and/or new modules so as to limit the impact of the deployment on production use of the server and/or other associated resources. Additionally, provisioning service 406 is configured to allow for non-compliant versions to be deployed with proper recordation/logging in place and for emerging or non-compliant versions to be declined.

The security service 408 provides uniform control over the security features applicable to the modular services 404. In this regard, the security service 408 provides uniform rules, regulations and procedures for security. For example, uniform rules related to authenticating a protocol/module, uniform rules associated with encryption, uniform rules for resolving a security conflict or the like.

The reporting service 410 provides uniform control over reporting functions associated with the modular services. For example, uniform control over what reporting is required, the contents of reports, parties receiving reports, actions that may result in alerts/notifications, parties receiving notification/alerts and the like.

The governance service 412 and audit service 413 provides uniform control over governance and auditing features applicable to the modular services. In this regard, the governance service 412 and audit service 413 provides uniform rules, regulations and procedures for rules exceptions, approval chains for granting exceptions, auditing procedures, auditing schedules and the like.

The modular services 404 provided by service delivery application 400 may include, but are not limited to, file transfer/movement module 414, messaging module 416, web services module 418, data archiving module 420 and any other service module 422.

File transfer/movement module 414 provides a unified open-source approach to moving data (e.g., file transfers, conducting transactions and the like) to and from devices (e.g., servers) deployed in the enterprise. The file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications. In specific embodiments of the invention, the file transfer/movement module 414 is configured to provide a web-accessible view to manage file transfer/data movement, as well as track/monitor the movement of data within the enterprise in real-time or near real-time.

In specific embodiments of the invention, the file transfer/movement module 414 is configured to provide for data movement/file transfer at the device-level and/or at the application-level, such that data can be moved from one networked device to another, from one networked device to an application, or from one application to another application. In further specific embodiments of the invention, the file transfer/data movement module 414 relies on the request management 202 function of the service delivery management framework 200 to provide a requisite protocol for file transfer, thus, eliminating the need to locate and implement a secondary network device to perform protocol-agnostic data movement/file transfer. As a result complexity and overhead are significantly reduced.

Moreover, in additional embodiments of the invention, the file transfer/movement module 414 is configured to provide entitlements at the server-level or at the data-level, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received. As a result, the devices from which the data is communicated and received remain secure throughout the data movement/file transfer/transaction process, since the user does not have physical access to the devices and, therefore, does have access to other files/data stored on those devices (e.g., use vulnerabilities associated with having to log-on to the servers/devices).

In additional embodiments of the invention, the file transfer/movement module 414 is configured to implement a device/server rating system as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

Messaging module 416 provides a unified open-source approach to message brokering/queuing. The messaging module may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. As such, the messaging module 414 provides a full-service, holistic approach that can be implemented enterprise-wide; obviating the need to deploy and maintain numerous disparate protocol and operating system-specific messaging applications.

Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. As such, the web services module 418 provides a full-service, holistic approach that can be implemented enterprise-wide; obviating the need to deploy and maintain numerous disparate protocols and operating system-specific web services applications.

Data archiving module 420 is configured to provide a unified open-source approach to data archiving. The data archiving module 420 is configured to provide one consolidated methodology for accessing different operating systems and networked devices to archive data. As such, the data archiving module 420 provides a full-service, holistic approach that can be implemented enterprise-wide; obviating the need to deploy and maintain numerous disparate protocol and operating system-specific data archiving applications.

Additionally, service delivery application 404 may include other known or future-known service modules 422, which can be configured to provide a consolidated methodology for accessing operating systems and network devices to perform the desired service.

Service delivery management framework 200 is a web services framework which serves to integrate and connect the services provided by the service delivery application

400. Service delivery management framework 200 is extensible and may be configured to include data transmission dashboard application 212 that is configured to provide a user management over the data file transfer/movement module 414 via a series of user-interfaces. As shown, the data transmission dashboard application 212 includes request management 202, inventory management 204, billing management 206, provisioning management 208 and operational status management 210.

As previously discussed, request management 202 is configured to manage a request to move data/transfer a file or the like. Request management 202 may include configuring the service, verifying security and compliance, verifying/receiving requisite approval chain and the like. In addition, request management 202 provides user-interfaces configured to allow the user to pre-configure, initiate or disable a data transmission. Additionally, request management 202 may provide user-interfaces configured to allow a user to configure routes for data transmission, timing for data transmission and/or protocols to be implemented for the data transmission.

Inventory management 204 may include user-interfaces that allow the user to access and analyze data transmission records including data types, connection points and the like across the enterprise for auditing purposes and the like. Additionally, inventory management 204 may include user-interfaces that allow the user to view archival set logs in order to see full tracking results including data transmission errors and the like.

Billing management 206 is configured to automatically determine the volume of data being moved/transferred, apply a billing rate to the data being moved/transferred, determine a billing entity associated with the data and communicate billing data (e.g., invoice) to the billing entity. In addition, billing management 206 may include user-interfaces that allow users the ability to manage the billing process and provide for uniform billing across the enterprise.

Provisioning management 208 is configured to work in unison with the provisioning service 406 in the common core services 402 of the delivery service application 400 to provide a unified approach to provisioning new modules and updates/revisions to existing modules. Such provisioning management includes determining deployment times and schedules and the like.

Operational status management 210 includes providing a user-interface that is configured to provide real-time access to tracking data and performance metrics, such as real-time tracking of data movement/file transfer within the enterprise. In this regard, operational status management 210 may include user-interfaces configured to provide users a real-time view of current operational status of data transmissions or any other service provided by the modular service delivery application 400. Additionally, operational status 210 may include user-interfaces configured to allow a user to manage and configure alerts associated with data transmission and operational status.

Referring to FIG. 3 a block diagram is presented of the apparatus 500, which is configured for providing technology/OS-agnostic and protocol-agnostic delivery of services within an enterprise, in accordance with embodiments of the present invention. In addition to providing greater detail, FIG. 3 highlights various alternate embodiments of the invention. The apparatus 200 may include one or more of any type of computing device, such as a server or the like. The present apparatus and methods can accordingly be performed on any form of one or more computing devices.

The apparatus 500 includes computing platform 502 that can receive and execute algorithms, such as routines, and applications. Computing platform 502 includes memory 504, which may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, processor, logic circuit, or other data processing device. Processor 506 or other processor such as ASIC may execute an application programming interface ("API") (not shown in FIG. 3) that interfaces with any resident programs, such as service delivery application 400 and routines, sub-modules associated therewith or the like stored in the memory 504 of the apparatus 500.

Processor 506 includes various processing subsystems (not shown in FIG. 3) embodied in hardware, firmware, software, and combinations thereof, that enable the functionality of apparatus 500 and the operability of the apparatus on a network. For example, processing subsystems allow for initiating and maintaining communications and exchanging data with other networked devices, such as hub server (10 of FIG. 1). For the disclosed aspects, processing subsystems of processor 506 may include any subsystem used in conjunction with service delivery application 400 and related algorithms, sub-algorithms, modules, sub-modules thereof.

Computer platform 502 may additionally include communications module (not shown in FIG. 3) embodied in hardware, firmware, software, and combinations thereof, that enables communications among the various components of the apparatus 500, as well as between the other networked devices. Thus, communication module may include the requisite hardware, firmware, software and/or combinations thereof for establishing and maintaining a network communication connection.

The memory 504 of apparatus 500 stores service delivery application 400 that is a modular-based, operating-system agnostic and protocol-agnostic means for providing services throughout an enterprise. In this regard, since the services that are provided are not tied to any one operating system or any one protocol, the service delivery application eliminates the need for the enterprise to execute and maintain a multitude of operating system-specific and protocol-specific service applications. As such, the service delivery application is instrumental in decreasing overhead costs associated with maintaining the multitude of diverse service applications. For example, the data transfer module 414 included in the service delivery application 400 eliminates the need for the enterprise to execute, maintain and ensure compatibility numerous different file transfer applications that may be specific to operating systems/hardware and operating using specific file transfer protocols.

In addition, the modular-based service delivery application 400 provides for comprehensive and unified management over the services delivered by the application 400. Such unified and comprehensive management of the services is accomplished by the common core services 402 included in the application 400. The common core services 402 are common to all of the modular services 404 in the application 400. The core services may include, but are not necessarily limited to, provisioning 406, security 408, reporting 408, governance 410, tracking 411 and auditing 412. These core services may be applied to any of the modular services to which the core service is applicable. The application may be configured such that a user has access to one or more user-interfaces/dashboards that allow for the user to manage and/or view the common core services. The user-interface/dashboard may be configured to be specific to a common core service (e.g., such that each common core service UI/dashboard provides access to and control over each of the modular services 404) and/or specific to a modular service (e.g., such that each modular service UI/dashboard provides access to and control over each of the common core services for the specified modular service).

The provisioning service 406 is configured to provide for uniform deployment of new modular services 404 and deployment of revisions/updates to existing modular services 404. The security service 408 is configured to provide uniform control over the security features applicable to the modular services 404. In this regard, the security service 408 provides uniform rules, regulations and procedures for security. For example, the security service 408 provides uniform rules related to authenticating a protocol/module, uniform rules associated with encryption, uniform rules for resolving a security conflict or the like. The reporting service 410 provides uniform control over reporting functions associated with the modular services. For example, the reporting service 410 provides uniform control over what reporting is required, the contents of reports, parties receiving reports, and the like.

The governance service 412 is configured to provide uniform control over governance including, but not limited to, rules, regulations and procedures for rule exceptions, approval chains for granting exceptions and the like. The tracking service 411 is configured to provide uniform control and management over tracking functions associated with the modular services; such as, but not limited, tracking file transfer/data movement throughout the enterprise. The auditing service 413 is configured to provide uniform control auditing requirements, such as, but not limited to, auditing procedures, auditing schedules and the like.

The modular services 404 provided by service delivery application 400 are dictated by the needs of the enterprise and, therefore, will vary from enterprise-to-enterprise. In addition, since the system is modular-based additional modules can be inserted into the application 400 on an as needed basis. In specific embodiments of the invention, the modular services 404 included in the application 400 include file transfer/movement module 414 that is configured to provides a unified open-source approach to moving data (e.g., file transfers, conducting transactions and the like) to and from devices (e.g., servers) and/or applications deployed in the enterprise. In this regard, the file transfer/movement module 414 is configured to establish protocol-agnostic data connections 508 between networked devices (e.g., services) or applications residing in networked devices and to initiate data movement, file transfers, transactions via the established data connections.

As previously noted, the file transfer/data movement module 414 is configured to provide one consolidated methodology for accessing different operating systems and networked devices to move data to and from networked devices. As such, the file transfer/data movement module 414 provides a full-service, holistic approach that can be implemented enterprise-wide; obviating the need to deploy and maintain numerous disparate protocol and operating system-specific file transfer applications.

Moreover, in additional embodiments of the invention, the file transfer/movement module 414 is configured to provide server-level entitlements 510, as opposed to granting entitlements at the user-level. In this regard, the file transfer/module 414 looks at whether movement of data is permissible from device-to-device and/or application-to-application. A user is granted access to the file transfer/movement module 414 and may be pre-configured to perform certain actions within the file transfer/movement module 414 (i.e., the user has access at the application/module-level and may be provided granular access to perform specific actions only). If two network devices and/or two applications are configured so to be entitled for data transfer (i.e., entitled for a data connection/file transfer) any module user, pre-configured to use the module and perform the requisite function, can request data movement/file transfer between the devices and/or applications. In this regard, unlike conventional, file transfer applications, the user is not required to have nor are they provided physical access to the devices from which data is communicated and/or received.

In additional embodiments of the invention, the file transfer/movement module 414 is configured to implement a device/server rating system 512 as a means of determining whether the devices are entitled for a data connection (e.g., whether the devices can exchange data/conduct transactions or the like). In specific embodiments of the invention, the rating system may be based on the type of data that a device is configured to send or receive (e.g., confidential data, proprietary data, public data and the like). In other specific embodiments of the invention, a secondary rating may be provided to account for the geographic location of the device within the enterprise (taking into account that certain geographic locations/countries may have rules/laws in place restricting the type of data that may be communicated/received within the countries geographic locale/boundaries).

In accordance with other embodiments of the invention, additional optional modular services 404 may include web services module 418, messaging module 416, data archiving module 420 and any other service module 422. Web services module 418 is configured to provide a unified open-source approach to enabling legacy applications that do not include web services with web services capabilities. In this regard, the web service module 418 communicates with the legacy application to create a web services interface and/or provide a web browser. The web services module 418 is configured to provide one consolidated methodology for accessing different operating systems and networked devices enable legacy applications with web services capabilities. Messaging Module 416 provides a unified open-source approach to message brokering/queuing. The messaging module 416 may comprise message-oriented middleware that supports sending and receiving messages between distributed systems. The messaging module allows application modules to be distributed over heterogeneous platforms and reduces the complexity of developing applications that span multiple operating systems and network protocols. The module 416 creates a distributed communications layer that insulates the module from specifics of operating systems and network interfaces. Data archiving module 420 is configured to provide a unified open-source approach to data archiving. The data archiving module 420 is configured to provide one consolidated methodology for accessing different operating systems and networked devices to archive data.

Referring to FIG. 4 a block diagram is presented of an apparatus 600, which is configured managing a data transmission service, delivered by a technology/OS-agnostic and protocol-agnostic service delivery application, through implementation of a dashboard presentation, in accordance with embodiments of the present invention. In addition to providing greater detail, FIG. 4 highlights various alternate embodiments of the invention. The apparatus 600 may include one or more of any type of computing device, such as a server or the like. The present apparatus and methods can accordingly be performed on any form of one or more computing devices.

The apparatus 600 includes computing platform 602 that can receive and execute algorithms, such as routines, and applications. Computing platform 602 includes memory 604, which may comprise volatile and non-volatile memory, such as read-only and/or random-access memory (RAM and ROM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Moreover, memory 604 may comprise cloud storage, such as provided by a cloud storage service and/or a cloud connection service.

Further, computing platform 602 also includes processor 606, which may be an application-specific integrated circuit ("ASIC"), or other chipset, processor, logic circuit, or other data processing device. Processor 606 or other processor such as ASIC may execute an application programming interface ("API") (not shown in FIG. 4) that interfaces with any resident programs, such as service delivery management framework/application 200 and data transmission dashboard application 212 routines, sub-modules associated therewith or the like stored in the memory 604 of the apparatus 600.

Processor 606 includes various processing subsystems (not shown in FIG. 4) embodied in hardware, firmware, software, and combinations thereof, that enable the functionality of apparatus 600 and the operability of the apparatus on a network. For example, processing subsystems allow for initiating and maintaining communications and exchanging data with other networked devices, such as networked servers (20 of FIG. 1). For the disclosed aspects, processing subsystems of processor 606 may include any subsystem used in conjunction with service delivery management framework/application 200, data transmission dashboard application 212, and related algorithms, sub-algorithms, modules, sub-modules thereof.

Computer platform 602 may additionally include communications module (not shown in FIG. 4) embodied in hardware, firmware, software, and combinations thereof, that enables communications among the various components of the apparatus 600, as well as between the other networked devices. Thus, communication module may include the requisite hardware, firmware, software and/or combinations thereof for establishing and maintaining a network communication connection.

The memory 604 of apparatus 600 stores service delivery management framework/application 200 that is a web services framework which serves to integrate and connect the services provided by the service delivery application 400 (shown in FIG. 3). Included within service delivery management framework 200 is data transmission dashboard application 212 which is configured to provide a user the ability to manage all facets of data transmission, delivered by the technology/OS-agnostic and protocol-agnostic service delivery application herein described, throughout an entire enterprise The data transmission dashboard application 212 is configured to provide one or more data transmission configuration user-interfaces 610 that allow a user to preconfigure data transmissions 612. Data transmission parameters that may be preconfigured include routing 614 (i.e., locations/servers within the enterprise that will receive, process (e.g., conduct transaction) and/or store the data), timing 616 (i.e., when data transmissions will occur (e.g., date, time of day), one-time-only, continuous and the like), protocol(s) 618 to implement for the transfer/transmission and other parameter 620 germane to the data transmission process. Additionally, data transmission configuration user-interfaces are configured to allow a user to initiate, on demand, a data transmission/transfer 622 and to disable or otherwise stop, on demand, a data transmission/transfer 624 from continuing. The disablement may be permanent or the disablement may be temporary, with the user-interface providing the user the ability to establish a time for resuming the data transfer/transmission.

Further, the data transmission dashboard application 212 is configured to provide one or more operational status user-interfaces 626 that allow a user to track, in real-time, the status 628 of any data transmission provided by the data transfer module. Real-time tracking includes the ability of the user-interface 626 to show the location/routing 630 of the data transmission (e.g., where the data is currently located/being processed, where the data has already been received/processed and/or where the data will subsequently be received/processed), the time currently incurred 632 by the data transmission, and/or the amount 634 (e.g., in terms of percentage, bytes or the like) of data currently transferred/processed at the location.

In addition, the data transmission dashboard application 212 is configured to provide one or more data transmission user-entitlement management user-interfaces 636 that allow a user to manage entitlements (i.e., permissions, access rights) for users of the data transmission service (i.e., individuals, users or systems that have a need to transfer/transmit data within the enterprise). The user-interfaces 636 may provide the user the ability to grant entitlements on a highly granular basis, for example, the user-interfaces 636 may be configured to grant entitlements on a server-level 638 (i.e., a user can/cannot transfer data to and/or from a specified network device/server), or on a route-level 640 (i.e., a user can/cannot transfer data via a specified route), or entitlements may be based on any other parameter associated with the data transmission process.

Moreover, the data transmission dashboard application 212 is configured to provide one or more data transmission record and logging user-interfaces 642 that allow a user to analyze and review transaction records 644 and archival set logs 646 that include transmission errors and the like. The analysis of records 644 and set logs 646 provide for centralized tracking, better look-back and the like.

Additionally, the data transmission dashboard application 212 is configured to provide one or more data transmission billing management user-interfaces 648 that allow a user the ability to manage how data transmissions are billed out to the various entities within the enterprise. As such, billing management user-interfaces 648 may be configured to allow the user to set the rate for a specified an entity, vary the rate based on transmission times and the like.

In addition, the data transmission dashboard application 212 is configured to provide one or more data transmission auditing management user-interfaces 650 that allow a user to perform auditing functions required by the enterprise. The auditing, which may implement transactions records 644, set logs 646 and the like may be granular, specific to a data-type being transmitted, specific to connection points (i.e., network devices/servers), routes or the like.

Further, the data transmission dashboard application 212 is configured to provide one or more data transmission security/governance management user-interfaces 652 that allow a user to define and manage the rules for security (e.g., type of transfers allowed, protocols required, encryption required and the like) and governance (e.g., approval chains for granting permission to conduct a data transfer and the like). Additionally, the data transmission dashboard application 212 is configured to provide one or more data transmission alert management user-interfaces 654 that allow a user to define and manage alerts that may be communicated through the enterprise based on defined data transmission events (e.g., successful completion of data transfer, failure to complete data transfer and the like). As such the user-interfaces 654 may be configured to allow a user to manage alerts by specifying form of the alert (e.g., email, text and the like), timing of alerts, alert recipients and context of the alerts.

Thus, systems, apparatus, methods, and computer program products described above provide for an enterprise-wide centralized dashboard/user-interface for managing data transfer/movement provided by a technology-agnostic and protocol-agnostic data transfer/movement module. Such management includes controlling the initiation and disablement of data transfers and configuring routing, timing and protocol(s) for data transfers. In addition, the dashboard/user-interface may be configured to provide (i) centralized control over user entitlements at a highly granular level, such as server-level, route-level or the like, (ii) the ability to track data transmission progress, such as by providing users a real-time view of the status/location of enterprise-wide data transmission (iii) centralized management over data transmission records and set logs, such that a user can analyze data transmissions across the enterprise and view full tracking data including transmission errors and (iv) centralized control over security and governance of data transmissions, including approval/denial of data transmissions While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a centralized, protocol- and technology-agnostic management of data transmissions within an enterprise, the apparatus comprising:
   a plurality of networked servers, each server comprising
      a first computing-platform having a first memory and at least one first processor in communication with the first memory, each server comprising;
         a modular-based, service delivery application comprising computer-readable instructions stored in each first memory, executable by the first processor and including a data transfer module configured to provide protocol-agnostic data connections between a plurality of servers in the enterprise;
   one or more hub servers configured to provide protocol-agnostic file transfer between the plurality of servers in the enterprise, each hub server (i) comprising a second computing-platform having a second memory and at least one second processor in communication with the second memory, and each hub server (ii) in communication with the plurality of the networked servers; and
   a service delivery management framework comprising computer readable instructions for uniform management of a plurality of services across the enterprise stored in the memory, executable by a processor, wherein executing the computer readable instructions is configured to cause the processor to:
      receive a request from a user to initiate a file transfer between two servers of the plurality of networked servers and/or between two applications of the plurality of networked servers, wherein the user is pre-configured to initiate the file transfer and the user does not have physical access to the two servers or the two applications, wherein the request comprises a route for data transmission, a timing for data transmission and a protocol to be implemented for data transmission;
      implement a server-level entitlement comprising determining whether the requested file transfer is permissible between the two servers or the two applications, wherein determining whether the requested file transfer is permissible comprises:
         determining whether the two servers are entitled for a data connection by implementing a server rating system based on a type of data to be transferred and geographic locations of the two servers within the enterprise;
      initiate a file transfer at a device level and/or an application level, such that the file is transferred from (i) between the two servers, (ii) from a first server of the two servers and a first application of the two applications, and/or (iii) between the two applications;
      determine, via the service delivery management framework, a first protocol for the file transfer;
      establish a protocol-agnostic data connection between the two servers and/or between the two applications; and
      transfer, via the first protocol, the file at the device level and/or the application level such that the file is transferred between the two servers and/or the two applications without using a secondary network device to perform protocol-agnostic file transfer.

2. The apparatus of claim 1, wherein the file transfer is initiated by executing a service delivery application associated with a server of the two servers, wherein executing the computer readable instructions is further configured to cause the processor to:
   initiate the file transfer, via the service delivery application, by authenticating all services delivered by the service delivery application using a single Secure Socket Layer certificate stored on the server, without requiring separate predetermined Secure Socket Layer certificates to authenticate the data transfer between the two servers.

3. The apparatus of claim 1, wherein the server level entitlement is not a user-level entitlement comprising the user having access to the two servers and/or the two applications from which data is communicated or received.

4. The apparatus of claim 1, wherein executing the computer readable instructions is further configured to cause the processor to provide to the user, in real-time, a status of ongoing file transfer.

5. The apparatus of claim 1, wherein executing the computer readable instructions is further configured to cause the processor to provide records of completed data transmissions at a data type-level and a server-level for a purpose of enterprise-wide data transmission auditing.

6. The apparatus of claim 1, wherein executing the computer readable instructions is further configured to cause the processor to: allow the user to manage an enterprise-wide data transmission billing process for data transmissions, and enterprise-wide security and governance of data transmissions.

7. The apparatus of claim 1, wherein executing the computer readable instructions is further configured to cause the processor to provide one or more data transmission alerts based on data transmission events associated with the file transfer.

8. The apparatus of claim 1, wherein executing the computer readable instructions is further configured to cause the processor to receive from the user data transmission alert parameters comprising a form of the alert, a timing of the alert, alert recipients and a context of the alerts.

9. The apparatus of claim 1, wherein executing the computer readable instructions is further configured to cause the processor to provide the user access to archival uniform set logs of data transmission records that include full tracking and data transmission errors.

10. The apparatus of claim 1, wherein executing the computer readable instructions is further configured to cause the processor to:
receive a second request from the user to disable the file transfer, wherein the second requires comprises a time for resuming the data transfer; and
disable the file transfer based on the second request.

11. A computer program product for a centralized, protocol- and technology-agnostic management of data transmissions within an enterprise, wherein the enterprise is associated with a plurality of networked servers comprising a modular-based, service delivery application including a data transfer module configured to provide protocol-agnostic data connections between the plurality of servers in the enterprise, the computer program product comprising:
a non-transitory computer-readable medium comprising a set of codes for causing a computer to:
receive, via a processor, a request from a user to initiate a file transfer between two servers of the plurality of networked servers and/or between two applications of the plurality of networked servers, wherein the user is pre-configured to initiate the file transfer and the user does not have physical access to the two servers or the two applications, wherein the request comprises a route for data transmission, a timing for data transmission and a protocol to be implemented for data transmission;
implement, via the processor, a server-level entitlement comprising determining whether the requested file transfer is permissible between the two servers or the two applications, wherein determining whether the requested file transfer is permissible comprises:
determining whether the two servers are entitled for a data connection by implementing a server rating system based on a type of data to be transferred and geographic locations of the two servers within the enterprise;
initiate, via the processor, a file transfer at a device level and/or an application level, such that the file is transferred from (i) between the two servers, (ii) from a first server of the two servers and a first application of the two applications, and/or (iii) between the two applications;
determine, via the service delivery management framework, a first protocol for the file transfer;
establish, via the processor, a protocol-agnostic data connection between the two servers and/or between the two applications; and
transfer, via the first protocol, the file at the device level and/or the application level such that the file is transferred between the two servers and/or the two applications without using a secondary network device to perform protocol-agnostic file transfer.

12. The computer program product of claim 11, wherein the file transfer is initiated by executing a service delivery application associated with a server of the two servers, wherein the computer program product further comprises a set of codes for causing the computer to:
initiate, via the processor, the file transfer, via the service delivery application, by authenticating all services delivered by the service delivery application using a single Secure Socket Layer certificate stored on the server, without requiring separate predetermined Secure Socket Layer certificates to authenticate the data transfer between the two servers.

13. The computer program product of claim 11, wherein the computer program product further comprises a set of codes for causing the computer to provide to the user, via the processor, in real-time, a status of ongoing file transfer.

14. The computer program product of claim 11, wherein the computer program product further comprises a set of codes for causing the computer to provide, via the processor, one or more data transmission alerts based on data transmission events associated with the file transfer.

15. The computer program product of claim 11, wherein the computer program product further comprises a set of codes for causing the computer to receive, via the processor, from the user data transmission alert parameters comprising a form of the alert, a timing of the alert, alert recipients and a context of the alerts.

16. The computer program product of claim 11, wherein the computer program product further comprises a set of codes for causing the computer to:
receive, via the processor, a second request from the user to disable the file transfer, wherein the second requires comprises a time for resuming the data transfer; and
disable the file transfer based on the second request.

17. A method for a centralized, protocol and technology-agnostic management of data transmissions within an enterprise, wherein the enterprise is associated with a plurality of networked servers comprising a modular-based, service delivery application including a data transfer module configured to provide protocol-agnostic data connections between the plurality of servers in the enterprise, the method comprising:
receiving, via a processor, a request from a user to initiate a file transfer between two servers of the plurality of networked servers and/or between two applications of the plurality of networked servers, wherein the user is pre-configured to initiate the file transfer and the user does not have physical access to the two servers or the two applications, wherein the request comprises a route for data transmission, a timing for data transmission and a protocol to be implemented for data transmission;

implementing, via the processor, a server-level entitlement comprising determining whether the requested file transfer is permissible between the two servers or the two applications, wherein determining whether the requested file transfer is permissible comprises:
　　determining whether the two servers are entitled for a data connection by implementing a server rating system based on a type of data to be transferred and geographic locations of the two servers within the enterprise;
initiating, via the processor, a file transfer at a device level and/or an application level, such that the file is transferred from (i) between the two servers, (ii) from a first server of the two servers and a first application of the two applications, and/or (iii) between the two applications;
determining, via the service delivery management framework, a first protocol for the file transfer;
establishing, via the processor, a protocol-agnostic data connection between the two servers and/or between the two applications; and
transferring, via the first protocol, the file at the device level and/or the application level such that the file is transferred between the two servers and/or the two applications without using a secondary network device to perform protocol-agnostic file transfer.

18. The method of claim 17, wherein the method further comprises providing to the user, via the processor, in real-time, a status of ongoing file transfer.

19. The method of claim 17, wherein the method further comprises receiving, via the processor, from the user, data transmission alert parameters comprising a form of the alert, a timing of the alert, alert recipients and a context of the alert.

20. The method of claim 17, wherein the method further comprises:
　　receiving, via the processor, from a second request from the to disable the file transfer, wherein the second requires comprises a time for resuming the data transfer; and
　　disabling the file transfer based on the second request.

\* \* \* \* \*